Nov. 3, 1931.  L. A. PARADISE ET AL  1,830,332
CORN PICKER
Filed Jan. 16, 1928  3 Sheets-Sheet 2
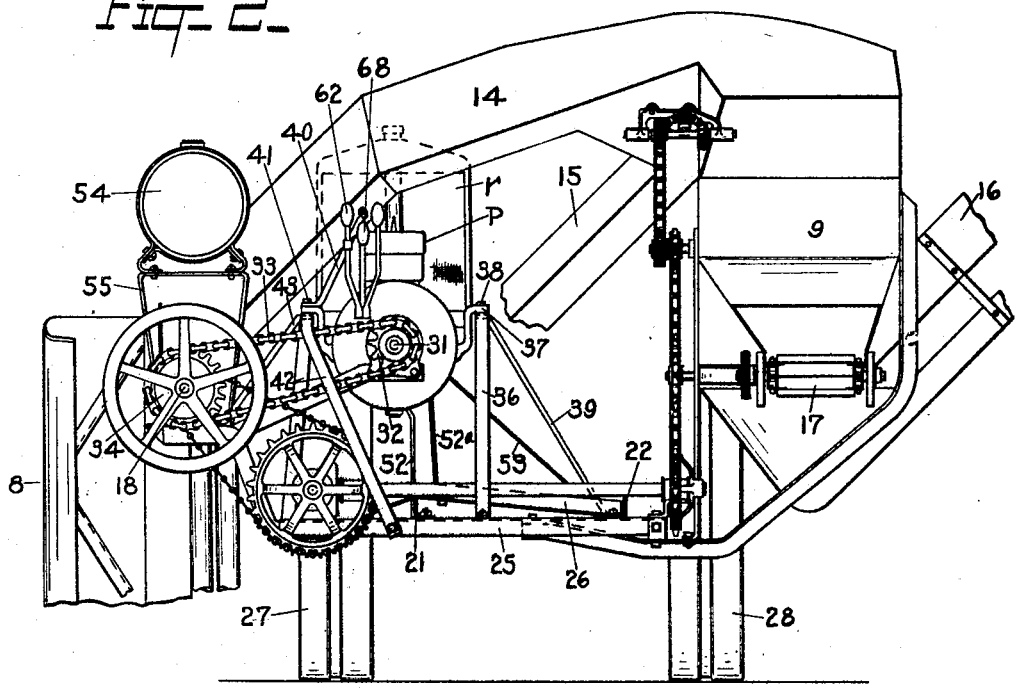
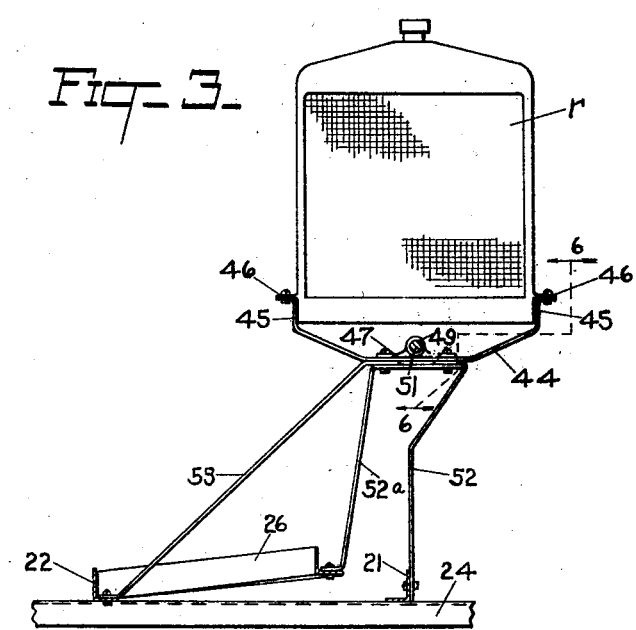

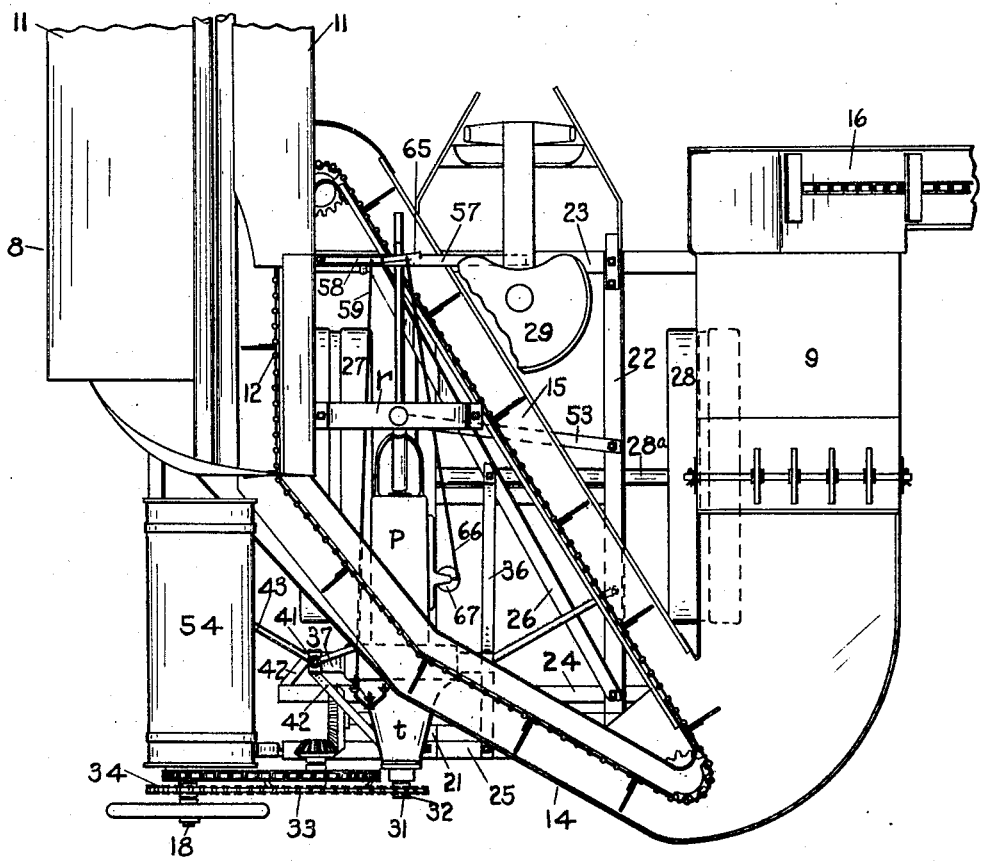
Fig_1_

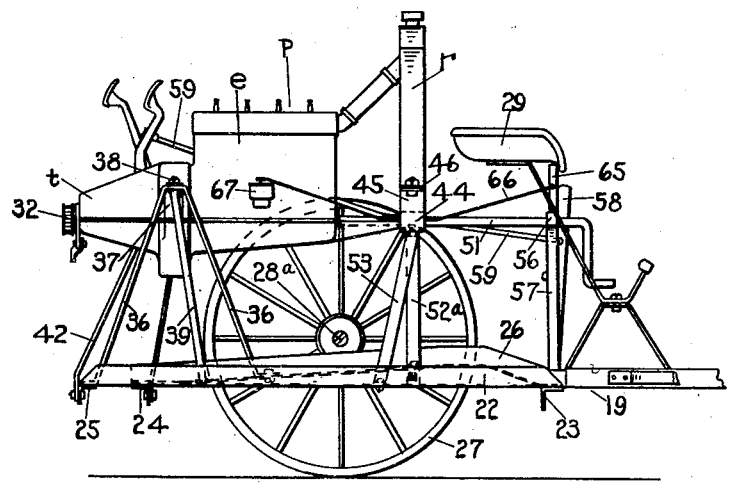
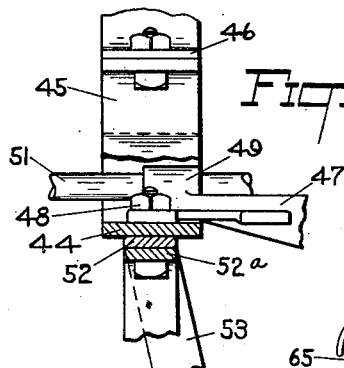
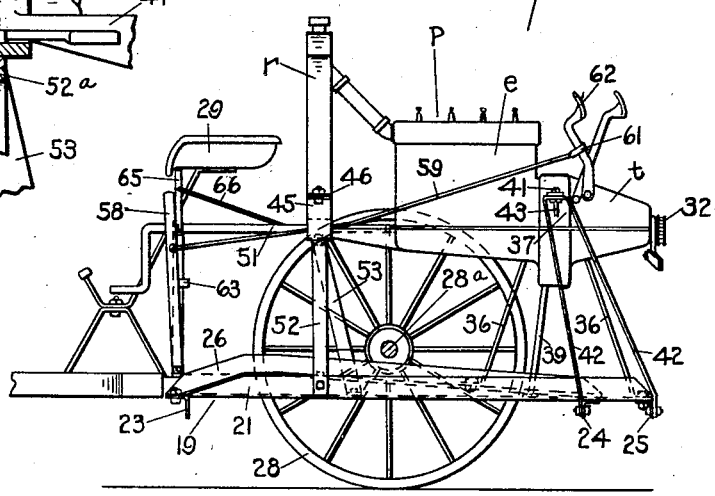

Patented Nov. 3, 1931

1,830,332

UNITED STATES PATENT OFFICE

LOUIS A. PARADISE AND WILBUR J. COULTAS, OF MOLINE, ILLINOIS, ASSIGNORS TO DEERE & COMPANY, OF MOLINE, ILLINOIS, A CORPORATION OF ILLINOIS

CORN PICKER

Application filed January 16, 1928. Serial No. 246,940.

The present invention pertains to machines designed for picking the ears of standing corn and husking these ears as a continuous operation; and it has as its general object to provide this type of implement with a power plant for driving the picking and husking mechanisms. Heretofore, the general practice has been to drive such mechanisms by traction power derived from the wheels of the implement, but this is frequently objectionable, particularly when the ground is wet, which makes it difficult to obtain the necessary traction energy to operate the machine efficiently. Such is avoided by providing a separate power plant on the implement for driving the picking and husking mechanisms; moreover, such mechanisms can then be operated at a speed of maximum efficiency irrespective of the speed of travel of the implement; and as a further advantage the draft pull of the implement is greatly decreased when the tractive energy of its wheels is not necessary for driving the picking and husking mechanisms. The power plant which is mounted on the implement is an internal combustion engine, preferably a complete power plant unit of the type heretofore employed in the Ford automobile.

The invention has for its more specific objects: to so relate and dispose the power plant on the implement, with reference to the other operating parts, as not to disturb the proper balance of the implement; to mount the power plant on the implement in such relation to the standard construction thereof as to avoid the necessity of making extensive alterations in the construction of the implement or departing from the conventional design thereof in order to accommodate the power plant; to provide an improved arrangement of supports for mounting the power plant on the implement; to provide for a simple and convenient control of the engine speed and the transmission of its drive to the operating mechanisms of the implement; and to provide other improved features in association with the mounting of the power plant on the implement, as will appear more fully in the following detailed description of the invention.

In the drawings accompanying this description:

Fig. 1 is a plan view of the rear portion of the corn picker, showing the power plant mounted thereon.

Fig. 2 is a rear elevational view thereof.

Fig. 3 is a detail view showing the mounting of the front of the power plant on the implement.

Fig. 4 is a fragmentary view illustrating the mounting of the power plant on the implement, as viewed from the right hand side of the power plant.

Fig. 5 is a similar view showing the mounting of the power plant on the implement, as viewed from the left hand side of the power plant; and Fig. 6 is a detail sectional view on the line 6—6 of Fig. 3 showing the mounting of the front end of the power plant.

The corn picker illustrated in Figs. 1 and 2 is of a well known conventional construction, and hence it will not be necessary to describe the construction and operation thereof in detail. Considering the operating mechanisms broadly, the corn picking mechanism 8 is generally located at the left hand side of the machine and the husking mechanism 9 at the right hand side thereof. The picker mechanism 8 comprises the usual gathering arms 11 for guiding the stalks into the machine, with which gathering arms a pair of inclined snapping rolls cooperate. It will not be necessary to describe these snapping rolls, as their construction and operation is well known. As the ears are snapped from the stalks, they fall into the path of an elevator 12 which conveys the ears to the husking mechanism 9 at the opposite side of the machine. Such elevator comprises the usual endless chain having conveyor members affixed thereto at spaced points, which conveyor members move upwardly alongside the snapping rolls in the gatherer arms 11, for receiving the ears of corn as they are snapped from the stalks. This conveyor chain thence passes upwardly and over to the other side of the machine through an inclined channel 14, which represents the feeding flight of the elevator. The return path of the elevator is through a channel 15 which inclines downwardly and forwardly, and to the left, for extending the path of the elevator down to a forward point on the inner gatherer arm 11. The channel 15 represents the return flight of the elevator. It is not necessary to illustrate the detail construction of the elevator, as the same is well known. The ears discharged from the upper end of the elevator slide down into the husking mechanism 9, which comprises any suitable arrangement of inclined husking rolls, which strip the husks, silks etc. from the ears as the latter travel down along the upper surfaces of the rolls. It is customary to provide these implements with the wagon elevator or conveyor 16, on to which the husked ears are discharged for conveyance to a wagon traveling alongside of the implement. These implements are usually provided with other complementary devices, such as a husk conveyor 17 (Fig. 2) which serves to carry the husks and refuse back to a point of discharge at the rear end of the machine, as is well known.

All of the operating mechanisms above described are usually connected to a common drive shaft, such being represented by the shaft 18 which extends from the rear of the implement at the left hand side thereof (Fig. 1).

The several operating mechanisms are all mounted on a main frame 19 comprising two spaced, longitudinally extending frame bars 21 and 22, which are cross connected at their front ends by a transversely extending frame bar 23. The rear ends of the longitudinal frame bars 21 and 22 are also cross connected by spaced, transversely extending frame bars 24 and 25. The frame is preferably reinforced by an arched frame bar 26 which extends diagonally from the front frame bar 23 to the rear frame bar 24. The frame 19 is suitably supported on two laterally spaced wheels 27 and 28 which are disposed on the outer sides of the longitudinal frame bars 21 and 22, and which are mounted on an axle 28A which is suitably secured to said frame bars. This axle has not been shown in detail, to avoid obscuring the illustration, but its general construction and the mounting of the frame thereon will be apparent to those familiar with these implements. The forward end of the frame is usually supported on a fore carriage or tongue truck (not shown), the rearwardly disposed main wheels 27 and 28, however, carrying the major portion of the weight of the implement. The operator's seat 29 is usually supported adjacent to the front end of the implement frame. It will be noted that the picker mechanism 8 has a considerable overhang at the side of the machine, with the principal weight thereof disposed at a point located outwardly beyond the plane of the adjacent load bearing wheel 27, and that the husking mechanism 9 also has a considerable overhang at the opposite side of the implement, with the principal weight thereof disposed at a point located outwardly beyond the plane of the opposite load bearing wheel 28. As will hereinafter appear, the disposal of the power plant is such that its weight tends, in a measure, to counterbalance the overhanging weight of each of the picker and husking mechanisms.

As previously remarked, this power plant, which is designated P in its entirety, is preferably a Ford engine unit comprising the engine block $e$, the radiator $r$ and the planetary transmission mechanism $t$. In the typical Ford construction, these parts all constitute a unitary power plant, and the same is installed as such in the present implement. While the Ford unit is preferred, it will be evident that any other design of power plant may, of course, be employed in lieu thereof. Such power plant is installed in the implement facing forwardly, with the radiator $r$ disposed in rear of the operator's seat 29, and with the rear end of the power plant disposed substantially at the rear end of the frame 19. The stub shaft 31 which projects from the rear end of the transmission mechanism $t$ has a sprocket wheel 32 mounted thereon, over which is trained a sprocket chain 33. Said chain passes over a relatively large sprocket wheel 34 which is mounted on the rear portion of the drive shaft 18, whereby the power of the power plant P is transmitted directly to the drive shaft 18.

It will be observed that the fore and aft plane of the power plant is disposed between the load supporting wheels 27—28, and that the transverse plane thereof, or of the major portion of the power plant, is disposed in the transverse plane of these wheels. By disposing the fore and aft plane of the power plant between the fore and aft planes of the wheels, the weight of the power plant is effective for counterbalancing to a considerable extent the overhanging weight of the picker mechanism 8 and husking mechanism 9, so that the weight of the power plant counteracts the upwardly acting buckling stresses established in the central portion of the frame through such overhanging weight. By disposing the power plant in the fore and aft position shown, a considerable portion of the weight thereof is located directly over the centers of the wheels 27—28, and such portion of the weight that acts downwardly on the rear portion of the frame tends to counterbalance the weight of the long forwardly extending gatherer arms 11—11. Such disposal of the power plant also places the same in a position where it clears the operating parts of the standard corn picking machine above described, and avoids the necessity of making any alterations in the design thereof. It will be noted that the feeding flight 14 of the elevator 12 passes over the top of the engine block e, and the return flight 15 of the elevator passes downwardly below the radiator r, the power plant thus being embraced or confined within the feeding and return flights of the elevator.

Referring now to the manner of supporting the power plant on the implement, it will be observed from Figs. 2 and 4 that the right hand rear portion thereof is supported on an inverted U-shaped bar 36 which has one end bolted to the rear frame bar 25, and which has its other end bolted to the diagonally extending frame bar 26. In the standard Ford construction the housing of the transmission mechanism t is provided with an outwardly extending mounting bracket 37, and this bracket is bolted to the top of the support 36, as indicated at 38. A diagonal brace bar 39 extends downwardly from the upper end of the support 36 to a point of attachment on the longitudinally extending frame bar 22. The other mounting bracket 37 at the left hand side of the power plant is bolted at 41 to the top of another inverted U-shaped support 42. As shown in Fig. 1, the front leg of this support is bolted to the transverse frame bar 24, and the rear leg thereof is bent inwardly for bolting to the other transverse frame bar 25 at a point substantially below the power plant. A brace 43 is secured to the upper end of the support 42, and extends downwardly and fastens to the inner one of two longitudinal frame bars (not shown) which constitute a part of the frame for the picker mechanism 8 while a brace 40 is secured to the support 42 and extends upwardly to a point of attachment with the underneath side of the inclined channel 14. It will thus be seen that the mounting of the rear portion of the power plant is amply reinforced against stresses acting fore and aft and transversely of the implement.

The front end of the power plant is supported on a bar 44 which extends transversely under the radiator r, and which has upwardly extending ends so that the bar assumes the form of a saddle or stirrup in which the front end of the power plant is supported. The upwardly extending ends 45 of such bar are bolted to laterally projecting lugs or brackets 46 on the sides of the radiator r. Referring to Fig. 6, the crank case of the standard Ford engine has a forwardly projecting portion 47 which extends under the bottom of the radiator r, and which, in the present construction, is bolted to the support 44, as indicated at 48. Thus the typical three-point suspension of the Ford engine is retained in the present mounting. The forward extension 47 of the engine e is also usually provided with a bearing boss 49 in which the starting crank 51 is journaled, such starting crank also extending forwardly between the bottom of the radiator r and the supporting bar 44. The central portion of the supporting bar 44 is mounted on and sustained by a brace 52, which is bolted to the frame bar 21, and by a brace 52A which extends downwardly and is secured to the diagonal frame bar 26. The supporting bar 44 is held against lateral movement by a brace member 53 that is secured between the member 44 and the brace 52A and that extends downwardly and outwardly to a point of securement with the frame bar 22.

The fuel tank 54, which supplies fuel to the power plant, is preferably mounted on suitable supporting bars 55 which are secured to the frame bars of the picker frame.

The starting crank 51 is of special design, having a relatively long shaft portion for disposing the crank handle adjacent to the operator's seat 29, in a position where it can be rotated without striking adjacent parts of the implement. The front portion of this crank has support in a bearing 56 which is mounted on an inverted U-shaped supporting bar 57, the latter having its inclined legs secured to the front frame bar 23. The transmission of power from the power plant to the drive shaft 18 is controlled by a lever 58 which is pivotally supported on one leg of the U-shaped supporting bar 57, in proximity to the operator's seat 29. A rod 59 is linked to this control lever and extends rearwardly under the radiator r for attachment at 61 to the clutch pedal 62 of the transmission mechanism t. Referring to Fig. 5, the control lever 58 is adapted to engage a shoulder or lock 63 which projects laterally from the support 57. When the lever 58 is engaging the stop 63 the clutch pedal 62 is held in neutral. By pushing the lever 58 forwardly the transmission mechanism is thrown into low gear, and by allowing the lever to move backwardly past the stop 63 the transmission mechanism is thrown into high gear or direct drive for driving the operating parts of the machine at the desired working speed. The low gear drive enables the operating parts to be started slowly, thereby avoiding strain on such operating parts and on the motor. The speed of the motor is governed by a throttle lever 65 which is pivotally supported adjacent to the operator's seat, and which is operatively connected through a rod 66 with the throttle valve of the carburetor 67. The reverse pedal 68 (Fig. 2) which constitutes a standard control for the planetary transmission mechanism t enables the operating mechanism of the implement to be driven in a reverse direction in the event that any part of such operating mechanism should become jammed.

It will be understood that, if desired, the customary power transmission mechanism for driving the operating parts of the implement from the main wheels may be retained, so that these operating parts can be driven by traction power, instead of by the power plant, whenever desired.

What we claim as our invention and desire to secure by Letters Patent is:

1. In a corn picker, the combination with a frame comprising two longitudinally extending frame bars, two transversely extending frame bars adjacent to the rear end of said frame, a diagonal frame bar for reinforcing said longitudinal frame bars, two side wheels for said frame, corn picking and husking mechanisms on opposite sides of said frame, and a drive shaft operatively connected to said picking and husking mechanisms, of a power plant for transmitting power to said drive shaft, said power plant comprising an internal combustion engine, planetary transmission mechanism and a radiator, said power plant extending longitudinally of said frame with its fore and aft plane disposed between the fore and aft planes of said wheels, an inverted U-shaped support for one side of said engine, said support having one leg secured to one of the transversely extending frame bars and the other leg secured to said diagonal frame bar, an inverted U-shaped support for the opposite side of said engine, the two legs of said latter support being secured to the two transversely extending frame bars, a stirrup shaped supporting bar extending below said radiator and having its ends secured to the sides thereof, the front end of said engine being supported on said latter bar below said radiator, and means for mounting said latter bar on the frame.

2. In a corn picker, the combination of a frame, two side wheels for said frame, corn picking and husking mechanisms on opposite sides of said frame, an operator's seat adjacent to the front end of said frame, a power plant extending longitudinally of said frame in a plane between the vertical planes of said wheels, said power plant comprising an internal combustion engine, a planetary transmission mechanism and a radiator, means for transmitting power from said planetary transmission mechanism to said picking and husking mechanisms, and means for controlling the speed selections and operation of said planetary transmission mechanism from a control point adjacent to the operator's seat.

3. In a corn picker, the combination with a frame comprising two longitudinally extending frame bars, two transversely extending frame bars adjacent to the front and rear ends of said frame, a diagonal frame bar for reinforcing said longitudinal frame bars, two side wheels for said frame, corn picking and husking mechanisms on opposite sides of said frame, and a drive shaft operatively connected to said picking and husking mechanisms, of a power plant for transmitting power to said drive shaft, said power plant comprising an internal combustion engine extending longitudinally of said frame with its fore and aft plane disposed between the fore and aft planes of said wheels, an inverted U-shaped support for one side of said engine, said support having one leg secured to the transversely extending rear frame bar and the other leg secured to said diagonal frame bar, an inverted U-shaped support for the opposite side of said engine, one of the legs of said latter support being secured to said transversely extending rear frame bar, and means for transmitting power from said engine to said drive shaft.

4. In a corn picker, the combination with a frame comprising two longitudinally extending frame bars, two transversely extending frame bars adjacent to the front and rear ends of said frame, a diagonal frame bar for reinforcing said longitudinal frame bars, two side wheels for said frame, corn picking and husking mechanisms on opposite sides of said frame, and a drive shaft operatively connected to said picking and husking mechanisms, of a power plant for transmitting power to said drive shaft, said power shaft comprising an internal combustion engine extending longitudinally of said frame with its fore and aft plane disposed between the fore and aft planes of said wheels, an inverted U-shaped support for one side of said engine, said support having one leg secured to said transversely extending rear frame bar and the other leg secured to said diagonal frame bar, means for supporting the opposite side of said engine, and means for transmitting power from said engine to said drive shaft.

5. In a corn picker, the combination with a frame comprising two longitudinally extending frame bars, two transversely extending frame bars adjacent to the front and rear ends of said frame, two side wheels for said frame, corn picking and husking mechanisms having overhanging supports beyond said wheels at the opposite sides of said frame, of a power plant for transmitting power to said picking and husking mechanisms, said power plant comprising an internal combustion engine and a radiator, said power plant extending longitudinally of said frame with its fore and aft plane disposed between the fore and aft planes of said wheels, lateral supporting members secured to the bars of said frame and connected with the sides of said engine, a stirrup shaped supporting bar extending below said radiator and having its ends secured to the sides thereof, the front end of said engine being supported on said latter bar below said radiator, means for mounting said latter bar on said frame, and means for transmitting power from said engine to said picking and husking mechanisms.

LOUIS A. PARADISE.
WILBUR J. COULTAS.